(12) United States Patent
Zhai et al.

(10) Patent No.: US 9,103,452 B2
(45) Date of Patent: Aug. 11, 2015

(54) LARGE-SCALE HYDRAULIC VARIABLE-SPEED FLOATING BOX FLAP VALVE

(75) Inventors: Songmao Zhai, Zhejiang (CN); Quanmin Li, Zhejiang (CN); Kangle Teng, Zhejiang (CN); Jianguo Ying, Zhejiang (CN); Rungen Liu, Zhejiang (CN); Dongliang Xiong, Zhejiang (CN)

(73) Assignee: NINGBO JUSHEN PUMPS INDUSTRY CO., LTD., Zhejiang (JP)

( * ) Notice: Subject to any disclaimer, the term of this patent is extended or adjusted under 35 U.S.C. 154(b) by 59 days.

(21) Appl. No.: 13/822,082

(22) PCT Filed: Oct. 28, 2011

(86) PCT No.: PCT/CN2011/081469
§ 371 (c)(1),
(2), (4) Date: Jun. 18, 2013

(87) PCT Pub. No.: WO2012/100572
PCT Pub. Date: Aug. 2, 2012

(65) Prior Publication Data
US 2013/0292589 A1    Nov. 7, 2013

(30) Foreign Application Priority Data

Jan. 28, 2011 (CN) .......................... 2011 1 0035198

(51) Int. Cl.
| | |
|---|---|
| F16K 1/20 | (2006.01) |
| E02B 7/44 | (2006.01) |
| E02B 13/02 | (2006.01) |
| F16K 1/16 | (2006.01) |
| F16K 31/122 | (2006.01) |
| F16K 15/03 | (2006.01) |

(52) U.S. Cl.
CPC ................. *F16K 1/2021* (2013.01); *E02B 7/44* (2013.01); *E02B 13/02* (2013.01); *F16K 1/165* (2013.01); *F16K 15/035* (2013.01); *F16K 31/1225* (2013.01)

(58) Field of Classification Search
CPC ....... F16K 1/20; F16K 1/2021; F16K 1/2057; F16K 31/1225; F16K 31/163; F16K 31/1635; F16K 1/16; F16K 1/165; F16K 1/24; E02B 7/40; E02B 7/44; E02B 13/00; E02B 13/02
USPC ............ 251/58, 62, 63.4, 228–229, 279–280, 251/298–303; 405/99–102
See application file for complete search history.

(56) References Cited

U.S. PATENT DOCUMENTS 1,561,544 A * 11/1925 How ............................... 251/229
2,535,525 A * 12/1950 Wolfe ............................ 251/229

(Continued)

*Primary Examiner* — John Bastianelli
(74) *Attorney, Agent, or Firm* — Lowe Hauptman & Ham LLP

(57) ABSTRACT

A large-scale hydraulic variable-speed floating box flap valve includes a hinge support, a valve seat, an upper valve leaf and a lower valve leaf, the valve seat and the hinge support are both fixed on a pump station base. The upper valve leaf is hinge-connected to the hinge support through a pin shaft, and the lower valve leaf is hinge-connected to the upper valve leaf. The upper valve leaf and the lower valve leaf may contact and match the valve seat in a sealed manner through a sealing structure. The upper valve leaf is connected to the lower valve leaf through at least one hydraulic mechanism. The hydraulic mechanism has one end hinge-connected to the upper valve leaf, and the other end hinge-connected to the lower valve leaf. The impact force between the valve leaves and the valve seat is damped by the hydraulic mechanism.

9 Claims, 8 Drawing Sheets

(56) References Cited

U.S. PATENT DOCUMENTS 3,037,737 A * 6/1962 Konemund et al. ............ 251/58
3,202,165 A * 8/1965 Yavicoli ....................... 137/107
3,510,101 A * 5/1970 Burtis ........................... 251/228
3,543,778 A * 12/1970 Martin .......................... 405/124
4,103,495 A * 8/1978 Graham ........................ 405/125

* cited by examiner

LARGE-SCALE HYDRAULIC VARIABLE-SPEED FLOATING BOX FLAP VALVE

RELATED APPLICATIONS

The present application is a National Phase of PCT/CN2011/081469, filed Oct. 28, 2011 and is based on, and claims priority from, Chinese Application No. 2011-10035198.3, filed Jan. 28, 2011.

FIELD OF THE INVENTION

The present invention relates to an accessorial device of a drainage and irrigation pump station, more specifically, to a large-scale hydraulic variable-speed floating box flap valve which applies to a pump of drainage and irrigation pump station and does flow closure work during stop time.

BACKGROUND OF THE INVENTION

The drainage and irrigation pump station is a complex provided for irrigation and drainage for pumping devices, buildings where the water flows in and out, pumping houses and accessorial devices thereof. The flap valve which is one of the important parts of the drainage and irrigation pump station is an accessorial device for flow closure during the water pump stop time of the drainage and irrigation pump station, and the main function of the flap valve is to stop river water from flowing backwards. At present, common flap valves comprise cast-iron flap valves hung with balanced hammer, floating box flap valves and side-turn-over flap valves, and the floating box flap valves are used most commonly. Usually, the floating box flap valves comprise circular floating box flap valves and quadrate floating box flap valves, as to the latter, the quadrate floating box flap valves comprise generally a valve leaf (as to the large-scale flap valves with the larger size, each valve leaf generally comprises an upper valve leaf and a lower valve leaf), a valve seat and a hinge support. The upper valve leaf and the lower valve leaf are hinge-connected to each other and the upper valve leaf is hinge-connected to the hinge support, and the valve leaf is hermetically connected to the valve seat. The flap valve is closed when the pump of the pump station is stopped, and when the pump is started, the flap valve is opened through the force of water.

However, as to large-scale floating box flap valve (as to flap valves generally larger than 3×3 meters), the shortcomings of the structure are as follows:

1) As to the large-scale flap valves, with larger size, weight of the valve leaf is gradually increased. Therefore, when the flap valve is closed, i.e., the valve leaf is folded, and the impact force between the valve leaves and the valve seat is gradually increased. Thus, the water sealing rubbers used for sealing the valve leaf and valve seat are damaged seriously, thereby resulting in the water sealing rubber is changed frequently and the cost is correspondingly increased. Meanwhile, great noise is made when the heavy valve leaf is striking the valve seat, thereby having an effect on the working environment of the pump station.

2) The sealing structure of the valve leaf and the valve seat in the prior art is as follows: two pieces of mounting plates with the same size are weld upon and under the valve seat. Through holes are bored on the mounting plates, and at the time of assembling, the water sealing rubber whose one end is turned up is placed between the two pieces of mounting plates. Bolts passing through the through holes on the mounting plates are screwed with nuts, and there are plenty of sealing structures on both sides of the valve seat respectively. In other words, it is needed to bore many through holes. Therefore, the assembling processes of these structures are complicated. Meanwhile, compression of the water sealing rubber is small, and as the size of the valve leaf is increased, only the compression of the water sealing rubber can not meet the sealing requirement between the valve leaf and the valve seat.

3) In the prior art, usually, a round hole is provided at the place on the hinge support where the upper valve leaf and the hinge support are hinged, and the upper valve leaf is hinged in the round hole through a pin shaft. Usually, this structure limits the hinged point of the upper valve leaf in a certain place and is immovable, but the whole valve leaf has a length size, with the increasing size of the valve leaf, the seal effect near the valve leaf and the valve seat is fairish, however, the seal effect farther from the valve leaf and the valve seat is very poor, thereby resulting in leakage.

4) In the prior art, scale between the upper valve leaf and the lower valve leaf of the valve leaf generally is that the upper valve leaf is big while the lower valve leaf is small. Thus, when river flow is not so great, the lower valve leaf is opened first. At the time of flow increasing, then the upper valve leaf is opened. However, in the condition of the small lower valve leaf, usually, the small lower valve leaf always can not meet the flow requirement at all, so it is always to open the upper valve leaf again, thereby resulting in great energy consumption and against energy saving.

SUMMARY OF THE INVENTION

The technical problems to be solved by the present invention is to provide a large-scale hydraulic variable-speed floating box flap valve which is capable of decreasing the damage of the water sealing rubber and reducing knocking noise of the valve leaves.

In order to solve the technical problems mentioned-above, the present invention provides a large-scale hydraulic variable-speed floating box flap valve comprising a hinge support, a valve seat, an upper valve leaf and a lower valve leaf; the valve seat and the hinge support are both fixed on a pump station base. The upper valve leaf is hinge-connected to the hinge support by a pin shaft, and the lower valve leaf is hinge-connected to the upper valve leaf. The upper valve leaf and the lower valve leaf may contact and match the valve seat in a sealed manner through a sealing structure. The upper valve leaf is connected to the lower valve leaf through at least one hydraulic mechanism. The hydraulic mechanism has one end hinge-connected to the upper valve leaf, and the other end hinge-connected to the lower valve leaf.

The hydraulic mechanism comprises an upper rack, a lower rack, a cylinder, a piston and a piston rod. Wherein, one end of the upper rack is connected to the upper valve leaf, and the other end is hinge-connected to the cylinder. The piston is slid within the cylinder, and an end of the piston rod is connected to the piston while the other end is hinge-connected to one end of the lower rack. The other end of the lower rack is connected to the lower valve leaf.

The end within the cylinder closed to the lower rack is connected to a cover plate which forms a slip fit with the piston rod. The cover plate comprises a plenty of screw holes which can be screwed with screwed plugs.

There are two hydraulic mechanisms which are provided in the left side and the right side of the flap valve respectively. The two hydraulic mechanisms are communicated with each other through pressure equalizing pipes between them.

There are two pressure equalizing pipes, wherein one end of each pipe is respectively communicated with one cylinder of the two hydraulic mechanisms, and the other ends are connected to connection and communicated with each other.

The sealing structure between the upper valve leaf and the lower valve leaf comprises an upper mounting plate, a lower mounting plate and water sealing rubber whose end is turned up. The upper mounting plate is welded onto the valve seat perpendicularly, and the lower mounting plate is obliquely welded onto the valve seat. An inner chamber is thus formed with a fixed end opening and a free-end opening which is smaller than the fixed end opening. The other end of the water sealing rubber which is not turned up is embedded in the inner chamber.

The sealing structure between the upper valve leaf and the lower valve leaf comprises a lateral mounting plate, a bottom mounting plate and water sealing rubber whose end is turned up. The bottom mounting plate is perpendicularly welded onto the lower valve leaf and the lateral mounting plate is obliquely welded onto a side of the bottom mounting plate. An inner chamber is thus formed with a fixed end opening and a free-end opening which is smaller than the fixed end opening. The other end of the water sealing rubber which is not turned up is embedded in the inner chamber.

A waist-shaped hole is provided at the place where the upper valve leaf and the hinge support are hinge-connected to each other, and the pin is slidably fitted within the waist-shaped hole.

Size of the upper valve leaf is smaller than that of the lower valve leaf.

With the construction mentioned-above, comparing to the prior art, the present invention has advantages as follows:

1) Because the hydraulic mechanisms are mounted on the upper and lower valve leaves, through the medium of water, when the flap valve is closed, i.e., the valve leaf is folded, and the impact force between the valve leaf and the valve seat is damped by the hydraulic mechanism. Thereby decreasing the damage of the water sealing rubber used for sealing the valve leaf and the valve seat, with the result that the water sealing rubber need not to be changed frequently and the cost is correspondingly reduced; meanwhile, noise which is made when the heavy valve leaf is striking the valve seat is also weakened, thereby ensuring the working environment of the pump station.

2) Additionally, with the numbers that the screwed plugs are matched with the screw holes on the cover plate, the water flow passing through the cylinder are controlled, so that the move speeds of the pistons and the piston rods are controlled, with the result that the closing speed of the valve leaf is controlled.

3) The pressure equalizing pipes added between the two hydraulic mechanisms keep water flow balance on both sides of the hydraulic mechanisms, in other words, keep the move speeds of the pistons and the piston rods at the left and right sides on the same level, thereby making the closing state of the valve leaf more stable. Moreover, the structure of using two pressure equalizing pipes and connection makes the assembly and maintenance more convenient.

4) The upper and lower mounting plates of the sealing structure are directly welded onto the valve seat, and the working procedure of boring through openings in the upper and lower mounting plates in the prior art is canceled. Then, the water sealing rubber is directly embedded between the upper and lower mounting plates. Therefore, the assembly process is very simple, convenient and quick. Again, because the lower mounting plate is obliquely welded, the opening formed by the free ends of the upper and lower mounting plates is smaller than that of the fixed ends so that the water sealing rubber is firmly embedded between the upper and lower mounting plates. Moreover, the size of the water sealing rubber is increased which enlarges the area of the portion of the water sealing rubber turned up, thereby increasing the compression of the water sealing rubber and making it being more suitable for meeting the seal requirement of the large sized valve leaf and valve seat. Likewise, the sealing structure between the upper and lower valve leafs performs the same function mentioned-above.

5) The round hole is displaced to the waist-shaped hole where the upper valve leaf and the hinge support are hinge-connected to each other making the pin at the hinged place being able to move slightly, i.e., the hinged point is not limited in a certain point. Thus, with increasing size of the valve leaf, even if the sealing structure off the hinged point can be kept paralleling with the sealing structure closed to the hinged point. Therefore, both the seal effects of the upper and lower sealing structures are better and prevent from leakage.

6) The scale between the upper and lower valve leaf of the valve leaf is changed to that the upper valve leaf is small and the lower valve leaf is big, thus, when river flow is not so great, only the lower valve leaf is opened which can basically ensure the river flow requirement and need not to open the upper valve leaf at all time, thereby reducing energy consumption and helping energy saving

Wherein:

In the prior art: 3'. valve seat; 5'. upper valve leaf; 8'. lower valve leaf; 9'. upper mounting plate; 10'. water sealing rubber; 11'. lower mounting plate; 15'. bolts; 16'. nut; 17'. water-seal pad I; 18'. water-seal pad II; 19'. water-seal plate;

The present invention:

1. hinge support; 2. pin shaft; 3. valve seat; 4. pressure equalizing pipes; 5. upper valve leaf; 6. connection; 7. hydraulic mechanisms; 71. upper rack; 72. lower rack; 73. cylinder; 74. piston rod; 75. piston; 76. cover plate; 77. screwed plug; 78. screw holes; 8. lower valve leaf; 9. upper mounting plate; 10. water sealing rubber; 11. lower mounting plate; 12. bottom mounting plate; 13. lateral mounting plate; 14. waist-shaped hole.

EMBODIMENT FOR CARRYING OUT THE INVENTION

The present invention will now be further described in detail with reference to the accompanying drawing and the embodiment.

Figure 1:
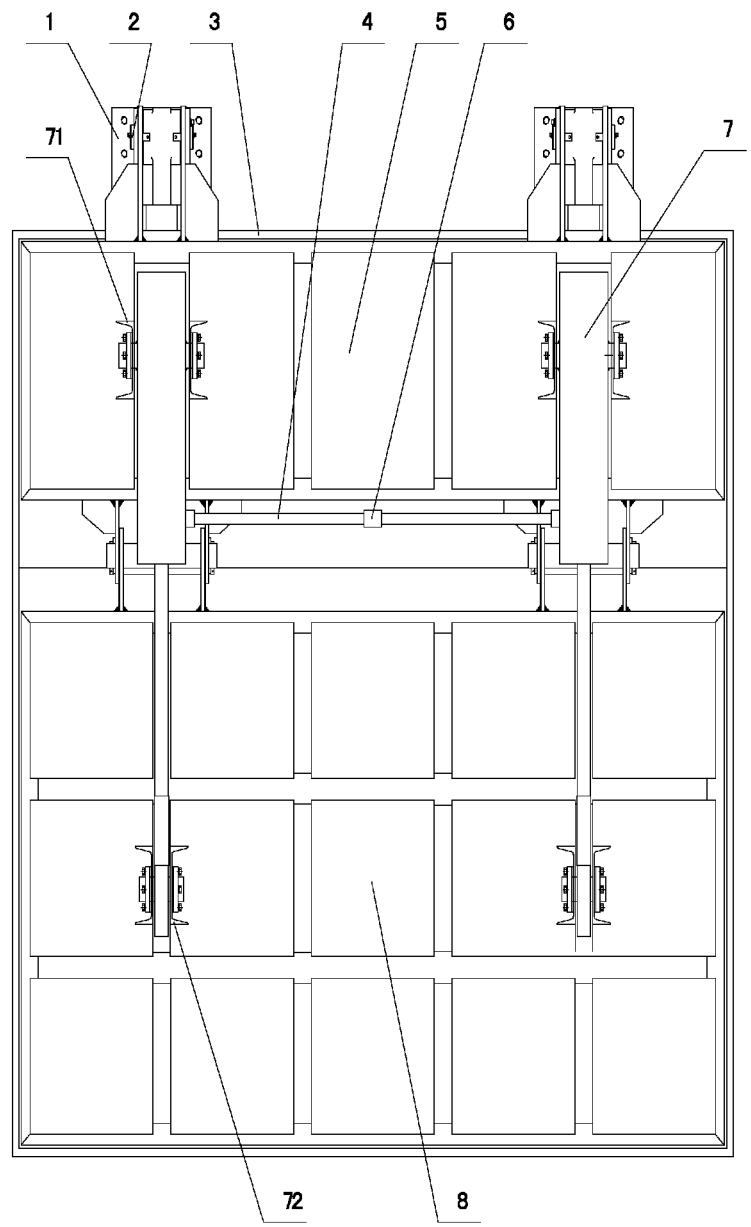
FIG. 1 is the elevation structural schematic view of a large-scale hydraulic variable-speed floating box flap valve according to the present invention.
Figure 2:
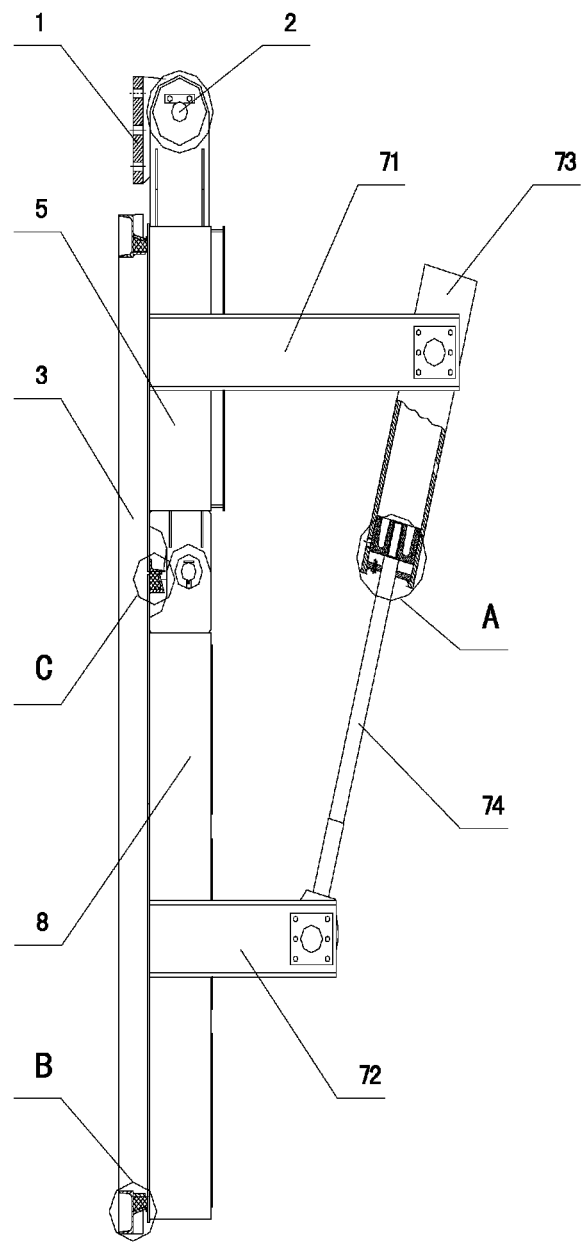
FIG. 2 is the side structural schematic view of a large-scale hydraulic variable-speed floating box flap valve according to the present invention.
Figure 3:
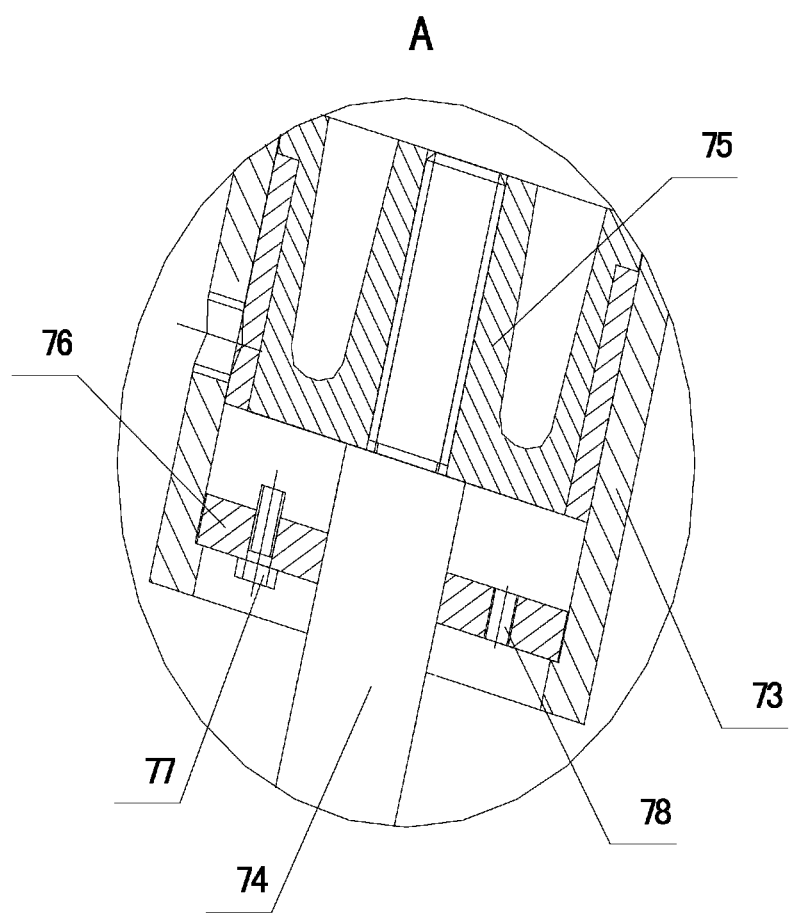
FIG. 3 is an enlarge structural schematic view of portion A in FIG. 2.

As shown in FIGS. 1-3, a large-scale hydraulic variable-speed floating box flap valve of the present invention comprises a hinge support 1, a valve seat 3, an upper valve leaf 5 and a lower valve leaf 8, wherein, the valve seat 3 and the hinge support 1 are both fixed on a pump station base. The upper valve leaf 5 is hinge-connected to the hinge support 1 through a pin shaft 2, and the lower valve leaf 8 is hinge-connected to the upper valve leaf 5. The upper valve leaf 5 and the lower valve leaf 8 may contact and match the valve seat 3 in a sealed manner through a sealing structure. The upper valve leaf 5 is connected to the lower valve leaf 8 through at least one hydraulic mechanism 7. The hydraulic mechanism 7 has one end hinge-connected to the upper valve leaf 5, and the other end hinge-connected to the lower valve leaf 8.

The hydraulic mechanism 7 comprises an upper rack 71, a lower rack 72, a cylinder 73, a piston 75 and a piston rod 74. Wherein, one end of the upper rack 71 is connected to the upper valve leaf 5, and the other end is hinge-connected to the cylinder 73. The piston 75 is slid within the cylinder 73, and an end of the piston rod 74 is connected to the piston 75, the other end is hinge-connected to one end of the lower rack 72, the other end of the lower rack 72 is connected to the lower valve leaf 8.

The end within the cylinder 73 closed to the lower rack 72 is connected to a cover plate 76 which forms a slip fit with the piston rod 74. The cover plate 76 comprises a plenty of screw holes 78 which can be screwed with screwed plugs 77.

In this embodiment, there are two hydraulic mechanisms 7 which are provided in the left side and the right side of the flap valve respectively. The two hydraulic mechanisms 7 are communicated with each other through pressure equalizing pipes 4 between them. There are two pressure equalizing pipes 4, and one end of each pipe 4 is respectively communicated with one cylinder 73 of the two hydraulic mechanisms 7, the other ends are connected to connection 6 and communicated with each other.

Size of the upper valve leaf 5 is smaller than that of the lower valve leaf 8.

Figure 4:
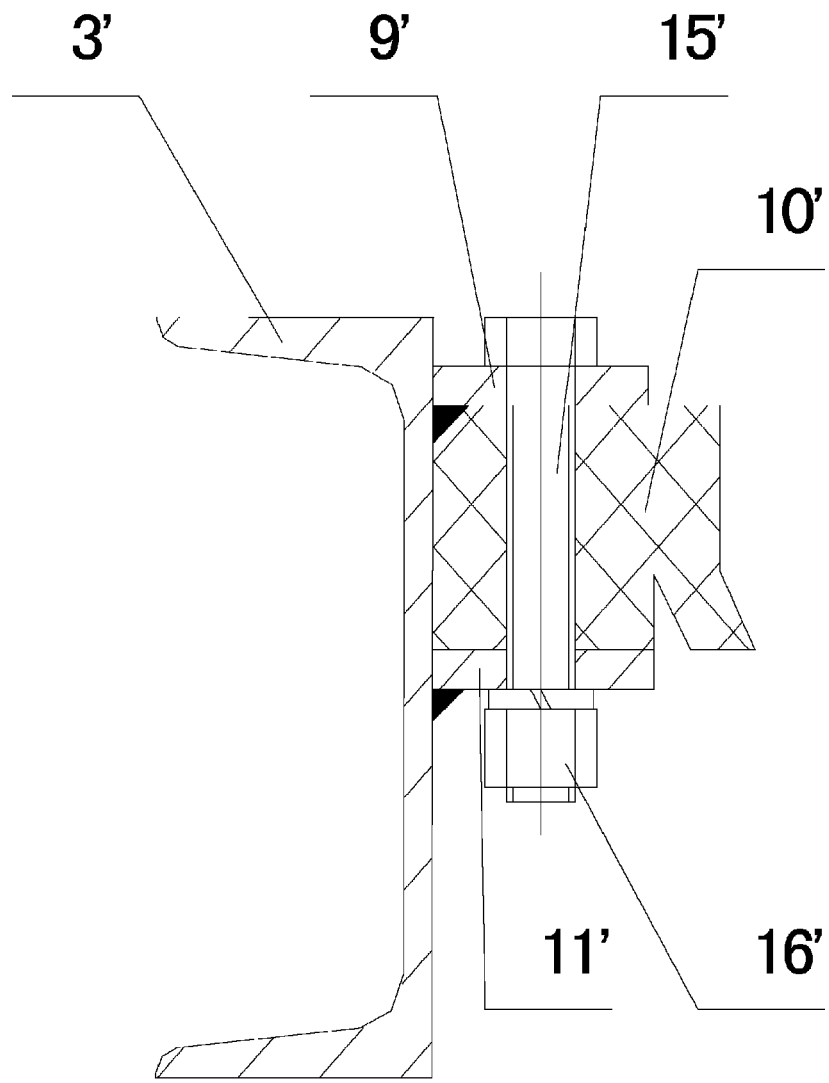
FIG. 4 is a seal structural schematic view of the valve leaf and the valve seat in the prior art.

Known from a seal structural schematic view according to the valve leaf and the valve seat in prior art as shown in FIG. 4, sizes and shapes of an upper mounting plate 9' and a lower mounting plate 11' is the same, and the upper mounting plate and the lower mounting plate are both welded onto the valve seat 3', and through holes are bored on both the upper mounting plate 9' and the lower mounting plate 11'. After the water sealing rubber 10' has been embedded between the upper mounting plate 9' and the lower mounting plate 11', bolts 15' and nuts 16' are further used to fix the water sealing rubber 10'.

Figure 5:
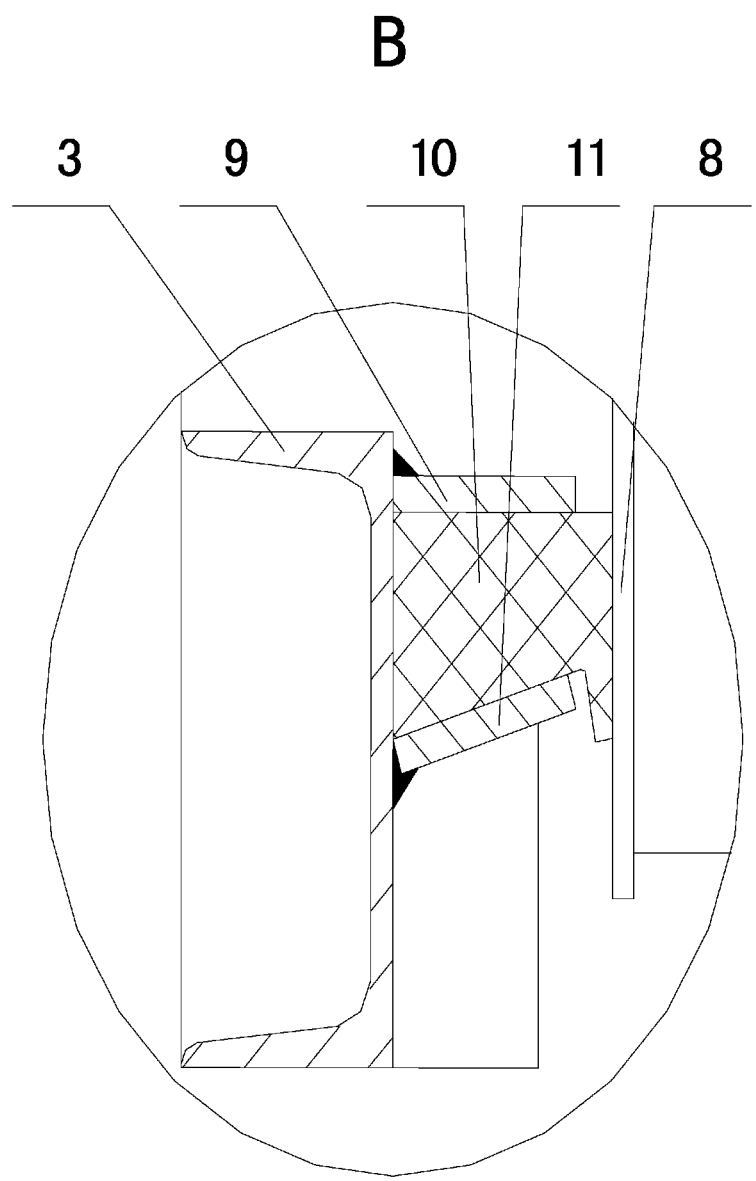
FIG. 5 is an enlarge structural schematic view of portion B in FIG. 2.
Figure 6:
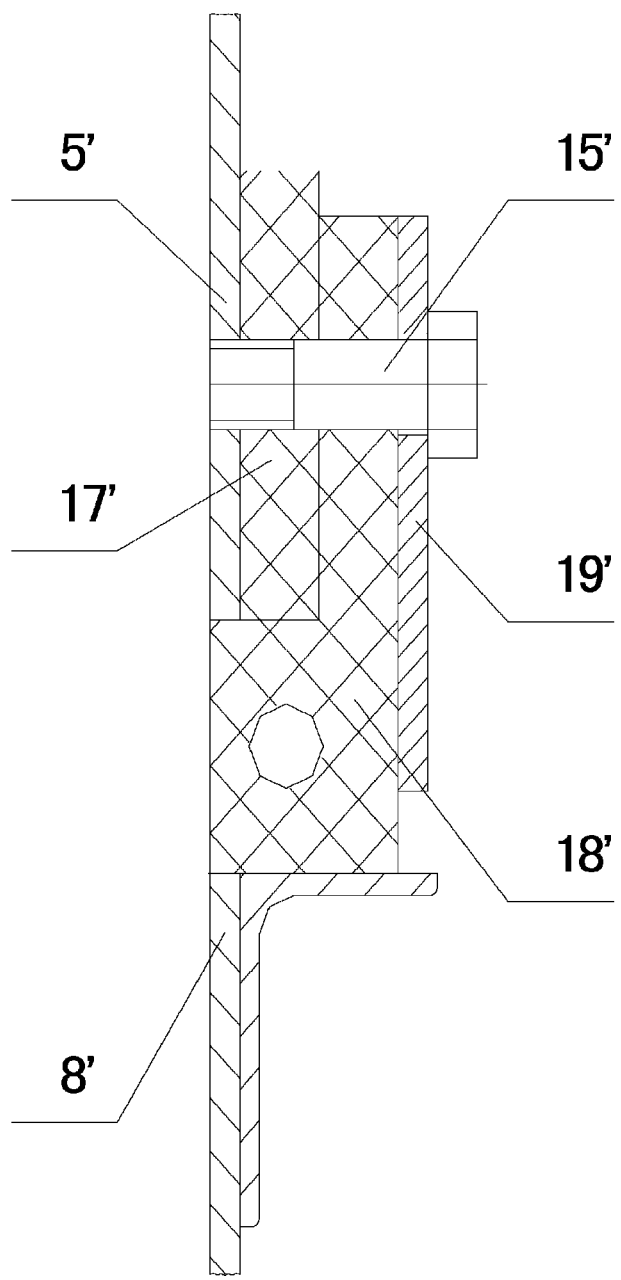
FIG. 6 is a seal structural schematic view of the upper valve leaf and the lower valve leaf in the prior art.

Known from the seal structural schematic view of the valve leaf and the valve seat according to the present invention as shown in FIG. 5, the sealing structure between the upper valve leaf 5 and the lower valve leaf 8 comprises an upper mounting plate 9, a lower mounting plate 11 and water sealing rubber 10 whose end is turned up. The upper mounting plate 9 is welded onto the valve seat 3 perpendicularly, and the lower mounting plate 11 is obliquely welded onto the valve seat 3. An inner chamber is thus formed with a fixed end opening and a free-end opening which is smaller than the fixed end opening. The other end of the water sealing rubber 10 which is not turned up is embedded in the inner chamber. This structure is very convenient to assemble. Known from a seal structural schematic view of the upper valve leaf and the lower valve leaf in the prior art as shown in FIG. 6, it comprises a water-seal pad 117', a water-seal pad II 18' and a water-seal plate 19'. The water-seal pad 117' and the water-seal pad II 18' are overlapped onto the upper valve leaf 5' in turn from inside to outside and then are pressed by the water-seal plate 19'. Finally, the bolts 15' are used to fix the water-seal pad I 17', the water-seal pad II 18' and the water-seal plate 19' to the upper valve leaf 5'. Therefore, it has to bore through holes or screw holes in the water-seal plate 19'.

Figure 7:
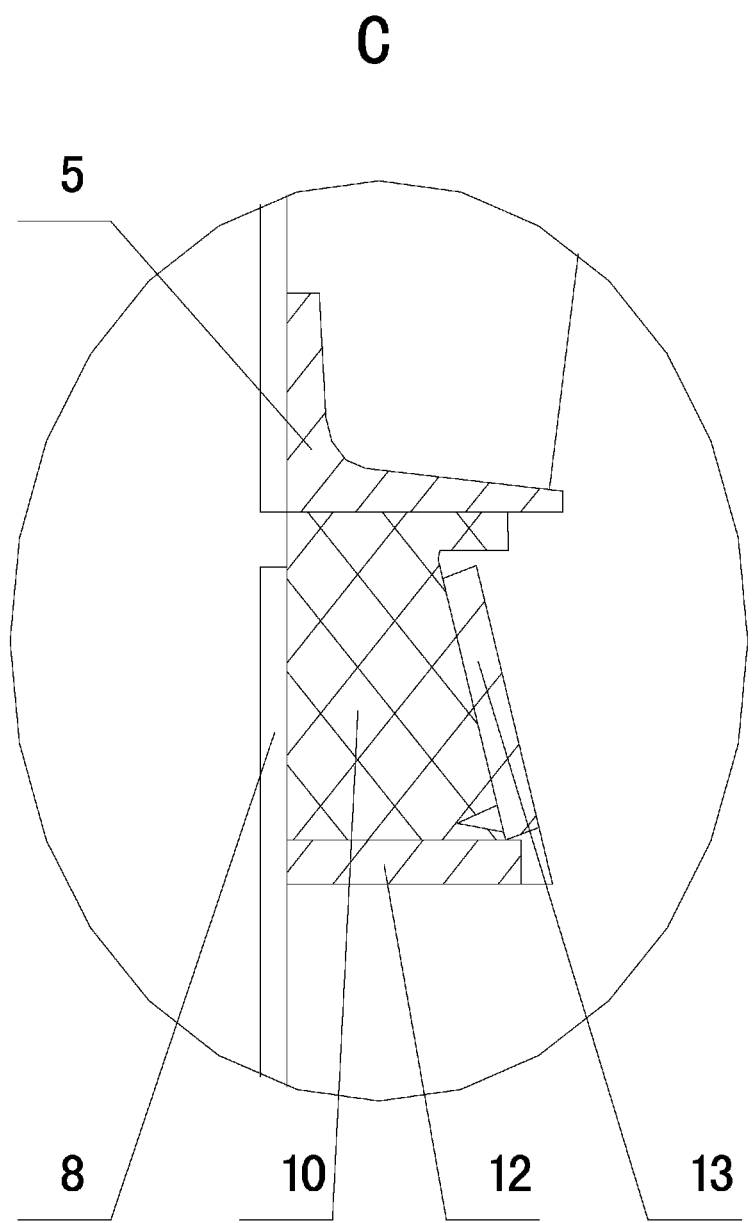
FIG. 7 is an enlarge structural schematic view of portion C in FIG. 2.

Known from a seal structural schematic view of the upper valve leaf and the lower valve leaf according to the present invention as shown in FIG. 7, the sealing structure between the upper valve leaf 5 and the lower valve leaf 8 comprises a lateral mounting plate 13, a bottom mounting plate 12 and water sealing rubber 10 whose end is turned up. The bottom mounting plate 12 is perpendicularly welded onto the lower valve leaf 8 and the lateral mounting plate 13 is obliquely welded onto a side of the bottom mounting plate 12. An inner chamber is thus formed with a fixed end opening and a free-end opening which is smaller than the fixed end opening. The other end of the water sealing rubber 10 which is not turned up is embedded in the inner chamber.

Figure 8:
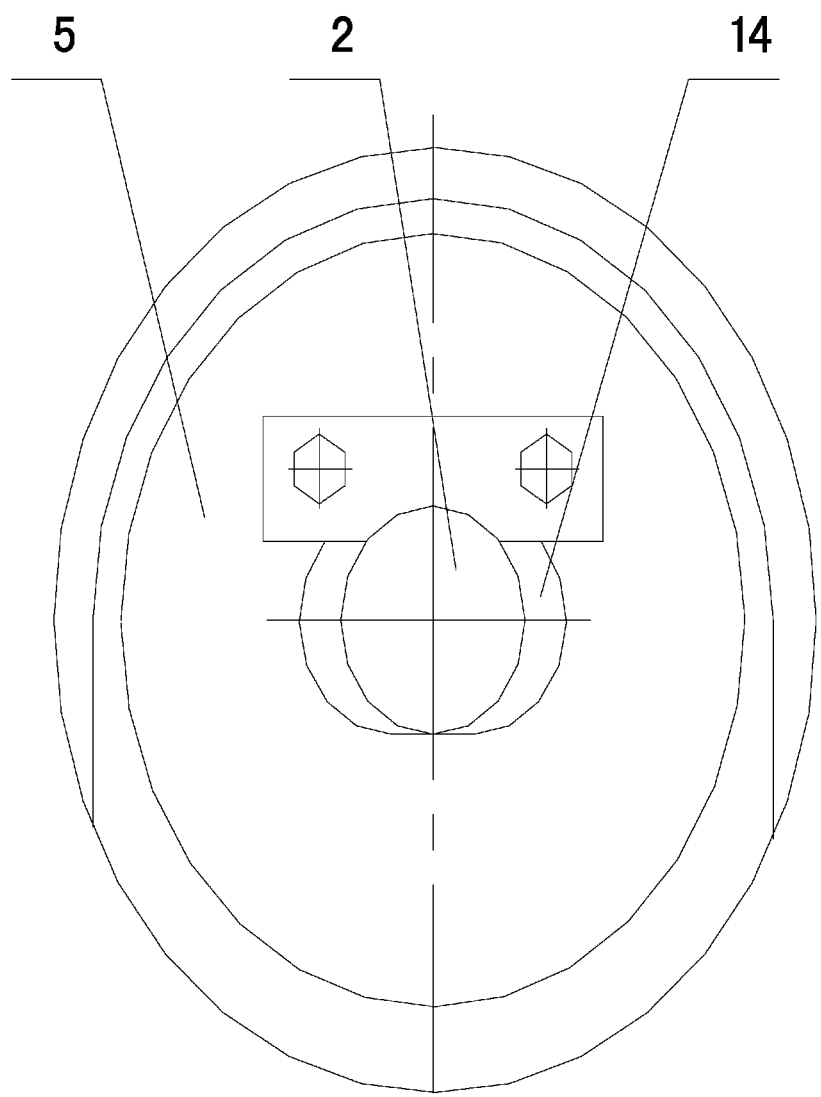
FIG. 8 is a partial enlarge structural schematic view of the place where the upper valve leaf and the hinge support are hinge-connected to each other of a large-scale hydraulic variable-speed floating box flap valve according to the present invention.

Known from a partial enlarge structural schematic view of the place where the upper valve leaf and the hinge support are hinge-connected to each other as shown in FIG. 8, the place where the upper valve leaf and the hinge support are hinge-connected to each other comprises a waist-shaped hole 14, and a pin shaft 2 is slidably fitted within the waist-shaped hole 14.

The assemble process of the large-scale hydraulic variable-speed floating box flap valve according to the present invention is as follows: at first, spare parts and accessories comprising the valve leaf, the valve seat and the hinge support are assembled as a whole within the factory by work-tools. Then, a plenty of short steel bars are spot welded between the valve leaf and the valve seat. After that, these assemblies are carried to the working field and assembled, and then the short steel bars are cut off, thereby ensuring the assembling precision on the working field.

The invention claimed is:

1. A large-scale hydraulic variable-speed floating box flap valve comprises a hinge support, a valve seat, an upper valve leaf and a lower valve leaf, the valve seat and the hinge support are both fixed on a pump station base, the upper valve leaf is hinge-connected to the hinge support through a pin shaft, and the lower valve leaf is hinge-connected to the upper valve leaf; the upper valve leaf and the lower valve leaf may contact and match the valve seat in a sealed manner through a sealing structure, wherein the upper valve leaf is connected to the lower valve leaf through at least one hydraulic mechanism, the hydraulic mechanism has one end hinge-connected to the upper valve leaf, and the other end hinge-connected to the lower valve leaf.

2. The large-scale hydraulic variable-speed floating box flap valve according to claim 1, wherein the hydraulic mechanism comprises an upper rack, a lower rack, a cylinder, a piston and a piston rod; wherein, one end of the upper rack is connected to the upper valve leaf, and the other end is hinge-connected to the cylinder; the piston is slid within the cylinder, and an end of the piston rod is connected to the piston, the other end is hinge-connected to one end of the lower rack, the other end of the lower rack is connected to the lower valve leaf.

3. The large-scale hydraulic variable-speed floating box flap valve according to claim 2, wherein the end within the cylinder closed to the lower rack is connected to a cover plate which forms a slip fit with the piston rod; the cover plate comprises a plurality of screw holes which can be screwed with screwed plugs.

4. The large-scale hydraulic variable-speed floating box flap valve according to claim 2, wherein there are two hydraulic mechanisms which are provided in the left side and the right side of the flap valve respectively; and the two hydraulic mechanisms are communicated with each other through pressure equalizing pipes between them.

5. The large-scale hydraulic variable-speed floating box flap valve according to claim 4, wherein there are two pressure equalizing pipes, and one end of each pipe is respectively communicated with one cylinder of the two hydraulic mechanisms, and the other ends are connected to connection and communicated with each other.

6. The large-scale hydraulic variable-speed floating box flap valve according to claim 1, wherein the sealing structure between the upper valve leaf and the lower valve leaf comprises an upper mounting plate, a lower mounting plate and water sealing rubber whose one end is turned up; the upper mounting plate is welded onto the valve seat perpendicularly, and the lower mounting plate is obliquely welded onto the valve seat; an inner chamber is thus formed with a fixed end opening and a free-end opening which is smaller than the fixed end opening; the other end of the water sealing rubber which is not turned up is embedded in the inner chamber.

7. The large-scale hydraulic variable-speed floating box flap valve according to claim 6, wherein the sealing structure between the upper valve leaf and the lower valve leaf comprises a lateral mounting plate, a bottom mounting plate and water sealing rubber whose one end is turned up; the bottom mounting plate is perpendicularly welded onto the lower valve leaf and the lateral mounting plate is obliquely welded onto a side of the bottom mounting plate; an inner chamber is thus formed with a fixed end opening and a free-end opening which is smaller than the fixed end opening; the other end of the water sealing rubber which is not turned up is embedded in the inner chamber.

8. The large-scale hydraulic variable-speed floating box flap valve according to claim 1, wherein the place where the upper valve leaf and the hinge support are hinge-connected to each other comprises a waist-shaped hole, and the pin shaft is slidably fitted within the waist-shaped hole.

9. The large-scale hydraulic variable-speed floating box flap valve according to claim 1, wherein size of the upper valve leaf is smaller than that of the lower valve leaf.

* * * * *